United States Patent
Lobban et al.

(10) Patent No.: US 12,399,974 B2
(45) Date of Patent: Aug. 26, 2025

(54) SYSTEMS AND METHODS FOR DECENTRALIZED RECOVERY OF IDENTITY ATTRIBUTES

(71) Applicant: JPMORGAN CHASE BANK, N.A., New York, NY (US)

(72) Inventors: Tyrone Lobban, London (GB); Christine Moy, New York, NY (US)

(73) Assignee: JPMORGAN CHASE BANK, N.A., New York, NY (US)

(*) Notice: Subject to any disclaimer, the term of this patent is extended or adjusted under 35 U.S.C. 154(b) by 522 days.

(21) Appl. No.: 17/315,692

(22) Filed: May 10, 2021

(65) Prior Publication Data

US 2021/0349988 A1   Nov. 11, 2021

Related U.S. Application Data

(60) Provisional application No. 63/022,015, filed on May 8, 2020.

(51) Int. Cl.
  *G06F 21/45* (2013.01)
  *G06F 21/31* (2013.01)
  *G06F 21/62* (2013.01)

(52) U.S. Cl.
  CPC .............. *G06F 21/45* (2013.01); *G06F 21/31* (2013.01); *G06F 21/6254* (2013.01)

(58) Field of Classification Search
  CPC .................................................... G06F 21/45
  See application file for complete search history.

(56) References Cited

U.S. PATENT DOCUMENTS

| | | | |
|---|---|---|---|
| 8,635,679 B2* | 1/2014 | Hardt | G06F 21/6254 713/168 |
| 9,104,858 B1* | 8/2015 | Sundaram | H04L 63/083 |
| 9,582,802 B2* | 2/2017 | Bachenheimer | G06Q 10/107 |
| 10,044,654 B2* | 8/2018 | Papa | H04L 51/212 |
| 2003/0167408 A1* | 9/2003 | Fitzpatrick | G06F 21/6245 713/193 |
| 2006/0095794 A1* | 5/2006 | Nunnelley | G06F 21/31 713/193 |
| 2006/0095958 A1* | 5/2006 | Lehinger | G06F 21/6245 726/6 |
| 2008/0222734 A1* | 9/2008 | Redlich | H04L 9/3271 726/26 |
| 2011/0161679 A1* | 6/2011 | Grube | H04L 63/10 713/193 |
| 2011/0265143 A1* | 10/2011 | Grube | G06F 11/0763 726/2 |

(Continued)

*Primary Examiner* — Ponnoreay Pich
(74) *Attorney, Agent, or Firm* — GREENBERG TRAURIG LLP

(57) ABSTRACT

Systems and methods for decentralized recovery of identity attributes are disclosed. In one embodiment, a method for decentralized storage of identity data may include: (1) receiving, at an identity management computer program executed by a computer processor, identity data from a user electronic device; (2) parsing, by the identity management computer program, the identity data into a plurality of portions; (3) mapping, by the identity management computer program, each portion to one of a plurality of storage locations; and (4) storing, by the identity management computer program, the plurality of portions to the plurality of storage locations based on the mapping.

20 Claims, 5 Drawing Sheets

(56) References Cited

U.S. PATENT DOCUMENTS

| | | | | |
|---|---|---|---|---|
| 2014/0068791 | A1* | 3/2014 | Resch | G06F 21/10 |
| | | | | 726/30 |
| 2014/0304157 | A1* | 10/2014 | Bachenheimer | G06Q 20/02 |
| | | | | 705/44 |
| 2017/0357826 | A1* | 12/2017 | Gouget | G06F 21/6254 |
| 2021/0049301 | A1* | 2/2021 | Gregori | G06F 21/6254 |
| 2021/0349988 | A1* | 11/2021 | Lobban | G06F 21/6254 |

* cited by examiner

SYSTEMS AND METHODS FOR DECENTRALIZED RECOVERY OF IDENTITY ATTRIBUTES

RELATED APPLICATIONS

This application claims priority to, and the benefit of, U.S. Provisional Patent Application Ser. No. 63/022,015, filed May 8, 2020, the disclosure of which is hereby incorporated, by reference, in its entirety.

BACKGROUND OF THE INVENTION

Field of the Invention

Embodiments relate generally to systems and methods for decentralized recovery of identity attributes.

Description of the Related Art

An individual's identity information, which may include Personally Identifiable Information (PII), may be stored on various devices. Individuals often store this information on their mobile electronic devices. If the mobile electronic device is compromised or lost, the individual's identity information may also be compromised.

SUMMARY OF THE INVENTION

Systems and methods for decentralized recovery of identity attributes are disclosed. In one embodiment, a method for decentralized storage of identity data may include: (1) receiving, at an identity management computer program executed by a computer processor, identity data from a user electronic device; (2) parsing, by the identity management computer program, the identity data into a plurality of portions; (3) mapping, by the identity management computer program, each portion to one of a plurality of storage locations; and (4) storing, by the identity management computer program, the plurality of portions to the plurality of storage locations based on the mapping.

In one embodiment, the identity data may include a plurality of identity data fields, and the identity management computer program parses each identity data field into portions.

In one embodiment, one of the storage locations may include portions from two of the plurality of identity data fields.

In one embodiment, the identity data may include personally identifiable information.

In one embodiment, the identity data may include data associated with the user.

In one embodiment, e method of claim 1, wherein the identity data may be parsed so that all portions are needed to reconstruct the identity data.

In one embodiment, the identity management computer program may select the storage locations randomly.

According to another embodiment, a method for identity data recovery from decentralized identity data storage may include: (1) receiving, by an identity management computer program executed by a computer processor, a request to retrieve identity data for a user from decentralized storage, wherein the identity data may be stored as a plurality of portions in a plurality of storage locations; (2) retrieving, by the identity management computer program, a mapping of the plurality of portions of identity data to the plurality of storage locations; (3) retrieving, by the identity management computer program, the plurality of portions of identity data from the plurality of storage locations; (4) reconstructing, by the identity management computer program, the plurality of portions of identity data using the mapping; and (5) providing, by the identity management computer program, the reconstructed identity data to an electronic device for the user.

In one embodiment, the identity data may include a plurality of identity data fields, and each portion may be parsed from one of the identity data fields.

In one embodiment, the identity data may include personally identifiable information.

In one embodiment, the identity data may include data associated with the user.

In one embodiment, the identity data may be parsed so that all portions are needed to reconstruct the identity data.

In one embodiment, the electronic device for the user may be configured to save the reconstructed identity data.

According to another embodiment a system may include an electronic device comprising a memory comprising an identity management computer program; and a computer processor; and a plurality of storage locations. The identity management computer program may be configured to: receive identity data for a user from a user electronic device; parse the identity data into a plurality of portions; map each portion to one of the plurality of storage locations; and store the plurality of portions to the plurality of storage locations based on the mapping.

In one embodiment, the identity data may include a plurality of identity data fields, and the identity management computer program parses each identity data field into portions.

In one embodiment, the identity data may include personally identifiable information.

In one embodiment, the identity data may be parsed so that all portions are needed to reconstruct the identity data.

In one embodiment, the identity management computer program may select the storage locations randomly.

In one embodiment, the identity management computer program may be further configured to: receive a request to retrieve identity data for the user from the plurality of storage locations; retrieve the mapping of the plurality of portions of identity data to the plurality of storage locations; retrieve the plurality of portions of identity data from the plurality of storage locations; reconstruct the plurality of portions of identity data using the mapping; and provide the reconstructed identity data to an electronic device for the user.

In one embodiment, the electronic device may be configured to store the reconstructed identity data in an electronic wallet.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Systems and methods for decentralized recovery of identity attributes are disclosed. Identity information is highly important, as it represents an individual and is a means of access to life. It is important that this information be securely stored. Identity information is complicated, having multiple dimensions, facets, types, and quantities.

A user's identity is lifelong, and does not expire during the user's lifetime, and for some time thereafter. The user's identity may change and be updated throughout one's life, adding and/or changing user identity information.

Individuals may store decentralized identity attributes on their desktop or in a mobile wallet. Examples of such decentralized identity attributes include attestations, such as those disclosed in U.S. patent application Ser. No. 17/174,650 filed Feb. 12, 2021, U.S. Provisional Patent Application Ser. No. 62/976,262 filed Feb. 13, 2020, U.S. Provisional Patent Application Ser. No. 62/972,560 filed Feb. 10, 2020, and U.S. Provisional Patent Application Ser. No. 63/126,335 filed Dec. 16, 2020. The disclosure of each is hereby incorporated, by reference, in its entirety. Other types of identity information may be stored as well.

Identity data may include a plurality of identity data fields. For example, a user's address may include identity data fields such as a house number, a street name, a city, a state, and a zip code. A user's name may include identity data fields, such as first name, middle name, and last name. A phone number may include identity fields such as area code, a prefix, and a line number. Each of these data fields may be parsed into separate portions.

In embodiments, the user's identity information may be stored across a plurality of random nodes, so that if a node is compromised, there is little or no risk of the user's identity being compromised. The maintenance of the user's identity information meets regulatory requirements, such as GDPR. Users may be allowed to destroy or remove their own identity information as they are self-sovereign.

Figure 1:
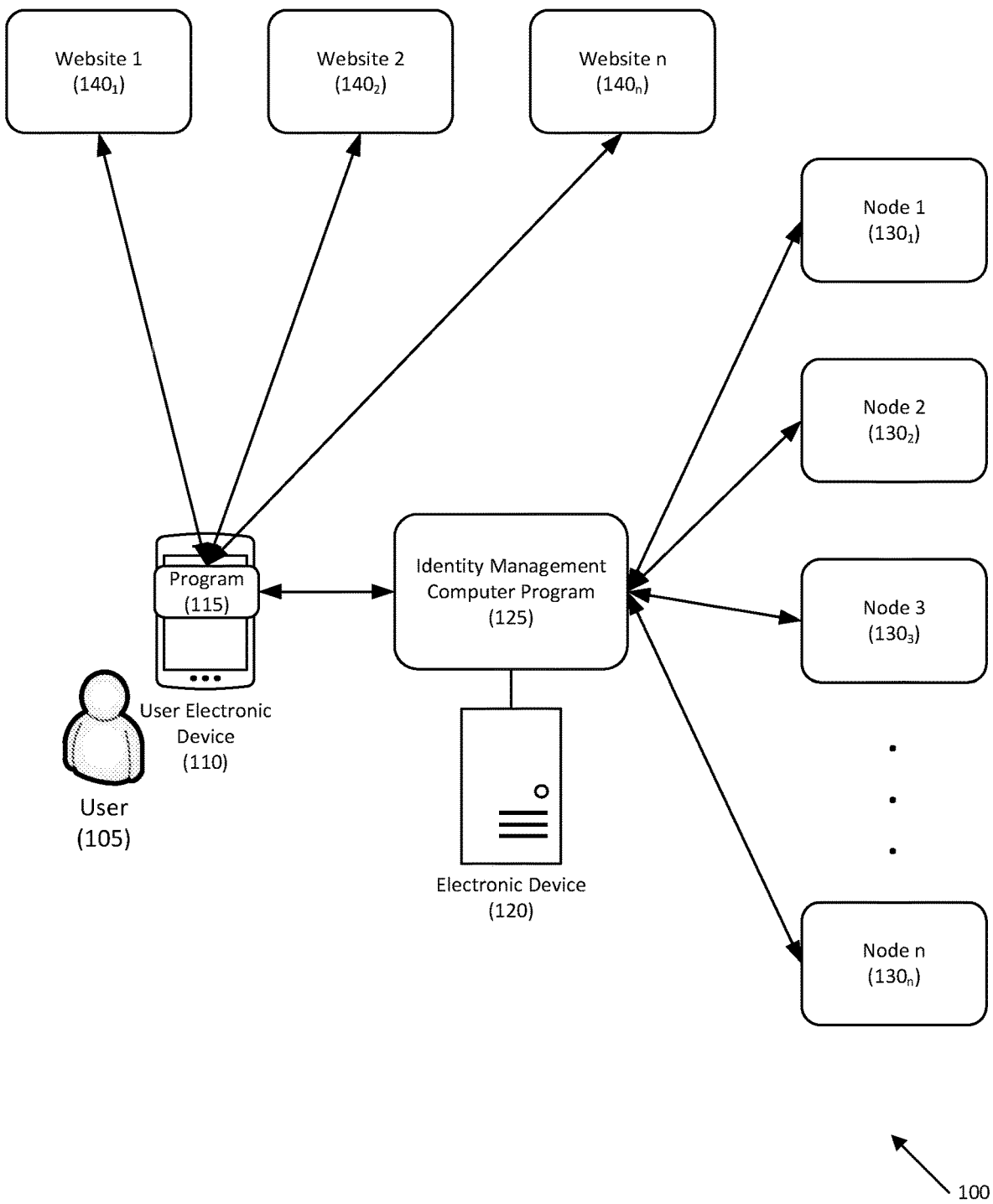
FIG. 1 depicts a system for decentralized recovery of identity attributes according to one embodiment.

Referring to FIG. 1, a system for decentralized recovery of identity attributes is disclosed according to one embodiment. System 100 may include user electronic device 110 that may be associated with user 105 and may execute user computer program or application 115. User electronic device 110 may be any suitable electronic device, including computers (e.g., workstations, laptops, desktops, tablets, etc.), smartphones, smart watches, Internet of Things (IoT) devices, etc. In one embodiment, user 105 may have a plurality of electronic devices 110.

User computer program or application 115 may be an application, a browser, etc., and may interface with identity management computer program 125 that may be executed by electronic device 120, such as a server (e.g., physical and/or cloud-based). Identity management computer program 125 may interface with a plurality of nodes 130 (e.g., node 130$_1$, 130$_2$, 130$_3$ . . . 130$_n$). Nodes 130 may be storage locations, other electronic devices, etc.

User computer program or application 115 may also access one or more website or network location, such as websites 140$_1$, 140$_2$, . . . 140$_n$. User 105 may log in to one or more websites 140 using any suitable login method (e.g., biometric, userid/password, etc.). Successful login(s) at one or more website 140 may be used to authenticate user 105 to identity management computer program 125, or to prove authentication to identity management computer program 125. Other methods and mechanism for authenticating user 105 to identity management computer program 125 may be used as is necessary and/or desired.

Figure 2:
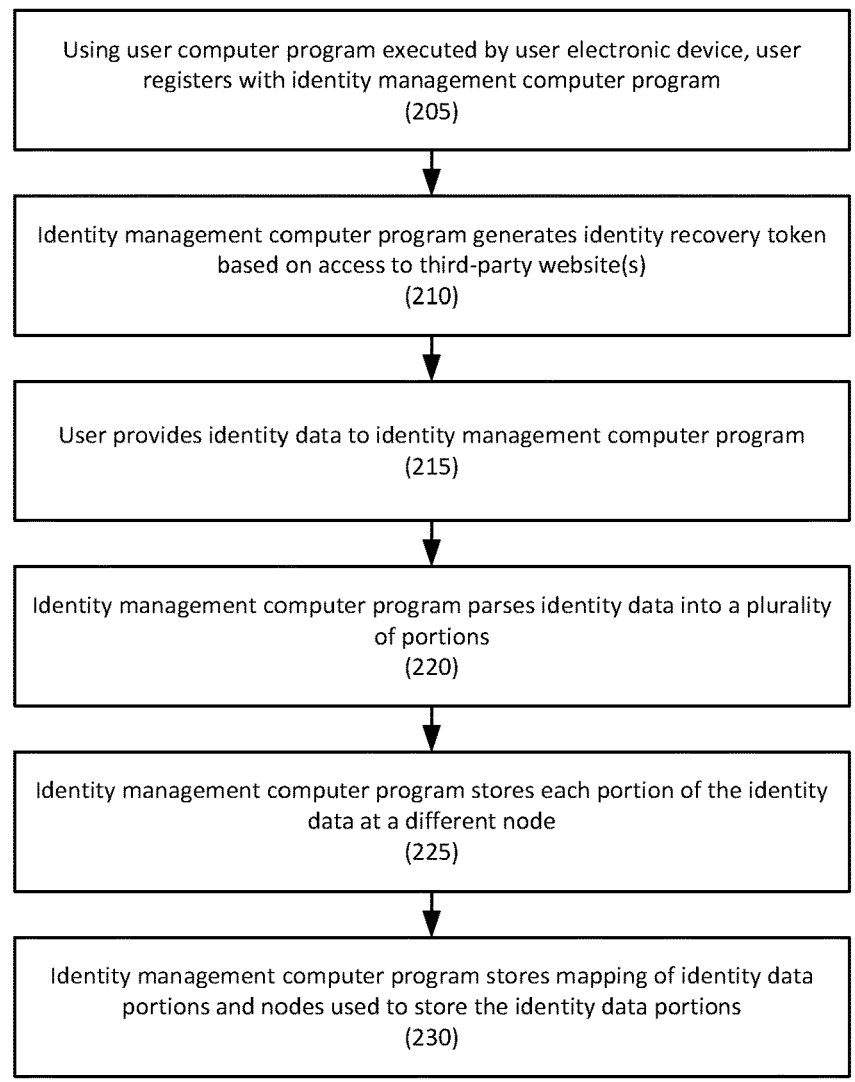
FIG. 2 illustrates a method for identity registration in a decentralized identity registration system according to one embodiment.

Referring to FIG. 2, a method for identity registration or identity data update in a decentralized identity registration system is disclosed according to one embodiment.

In step 205, a user may register with an identity management computer program. In one embodiment, the user may provide a user id and password, biometric, etc. to the identity management computer program to register with the identity management computer program. Any other steps to register with the identity management computer program may be used as is necessary and/or desired.

Figure 3:
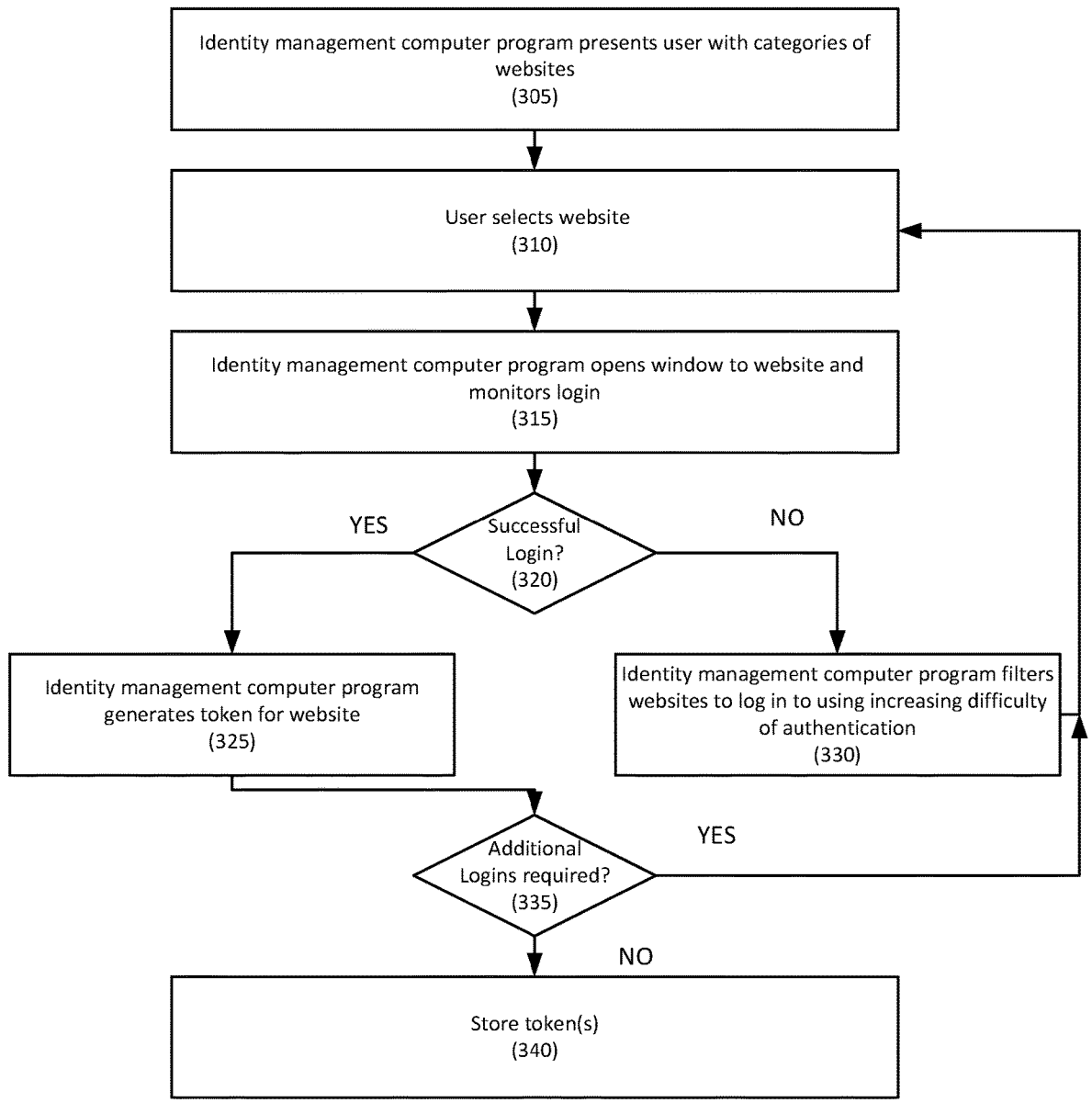
FIG. 3 depicts a method for generating an identity recovery token according to one embodiment.

In step 210, the identity management computer program may optionally generate an identity recovery token for the user based on the user successfully logging in to one or more website. Referring to FIG. 3, a method for generating an identity recovery token is disclosed according to an embodiment.

In step 305, the identity management computer program may present the user with one or more categories of websites to log in to. Examples of categories include social media websites, financial institution websites, utility websites, etc. In one embodiment, the identity management computer program may present popular websites for each category and the user may select one or more from each category.

In step 310, the identity management computer program may receive a selection of a website from the user.

In step 315, the identity management computer program may open a window to a login page for the website and may monitor the user's login. For example, the identity management computer program may determine whether the login was successful or not based on the message in the window from the website provider.

In step 320, if there was a successful login, in step 325, the identity management computer program may generate and store a token for the login. The token may identity the website, an IP address for the website, a timestamp, and an indication of success or failure. In one embodiment, standard authentication tokens may be used as is necessary and/or desired.

If the login was unsuccessful, in step 330, the identity management computer program may apply increasing difficulty of authentication logic and may filter the websites available for selection by the user. For example, if the user selects to login to websites that may be easy to create fake accounts on, such as a social media sites, the identity management computer program may may require the user to successfully log into additional websites (e.g., five instead of three), including ones with higher authentication requirements, such as a bank account. The process may then return to step 310.

In step 335, if additional logins are required, the process may return to step 310.

If additional logins are not required, in step 340, the identity management computer program may store the token(s). In one embodiment, the tokens may be stored in the same manner as identity data, described below.

Referring again to FIG. 2, in step 215, the user may provide identity data to the identity management computer program using the user computer program. For example, the identity data may include attestations, PII, passwords, account numbers, licenses, addresses, employer information, education information or any other data that may be associated with the user.

In step 220, the identity management computer program may parse the identity data into a plurality of portions. In one embodiment, the identity management computer program may parse individual data fields, such as a name, social security number, etc. into a plurality of portions so that one portion, if compromised, does not compromise the data field.

In step 225, the identity management computer program may store each portion of the identity data at a different node. For example, one portion may include different portions from different data fields (e.g., a first name with a house number, a street name with digits from the user's social security number, etc.). Thus, if one node is compromised, the compromised data would be meaningless.

For example, if the user's name is "Tom Jones," Node 1 may store "Tom" and Node 2 may store "Jones." Thus, if Node 1 were compromised, then "Tom" would mean little or nothing on its own.

In one embodiment, the identity management computer program may identify and select the nodes randomly. In one embodiment, the portions may be encrypted.

In step 230, the identity management computer program may store a mapping of identity data portions and nodes used to store the identity data portions. In one embodiment, the mapping may be used to reconstruct the identity data from the data portions when they are retrieved.

Once registered, the user may update existing information or add new identity information. For example, the user may log in to the system and amend or add new information about him or herself, thus adding to their identity. The system may store this additional identification information into additional randomly selected nodes.

Although one decentralized storage network is described above, it should be recognized that any suitable decentralized storage network, or methods of storing identity information in a decentralized manner, may be used as is necessary and/or desired.

Figure 4:
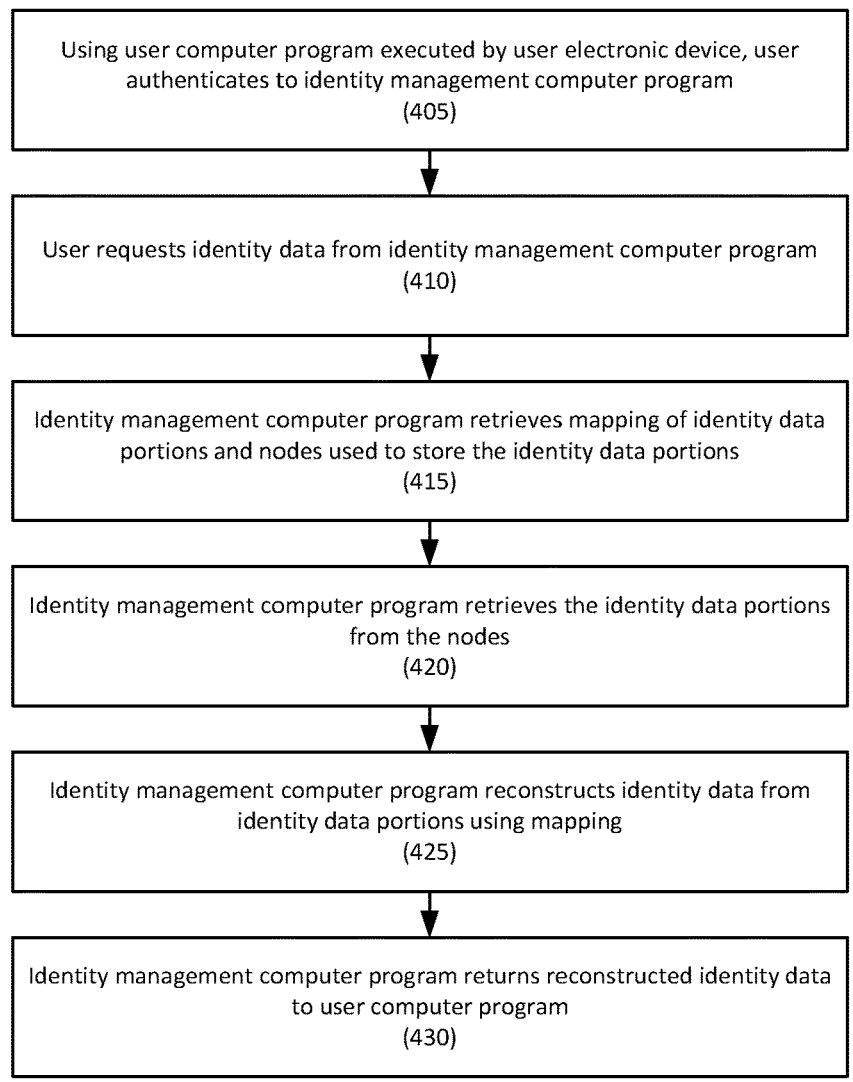
FIG. 4 depicts a method for decentralized recovery of identity attributes according to one embodiment.

Referring to FIG. 4, a method for decentralized recovery of identity attributes is disclosed according to one embodiment. For example, the user may be recovering his or her identity to store an up to date attestation in their wallet and/or because the user has lost some of his or her identity information.

In step 405, the user may authenticate to an identity management computer program. For example, the user may provide the userid and password, biometric, etc. that was provided during registration.

Figure 5:
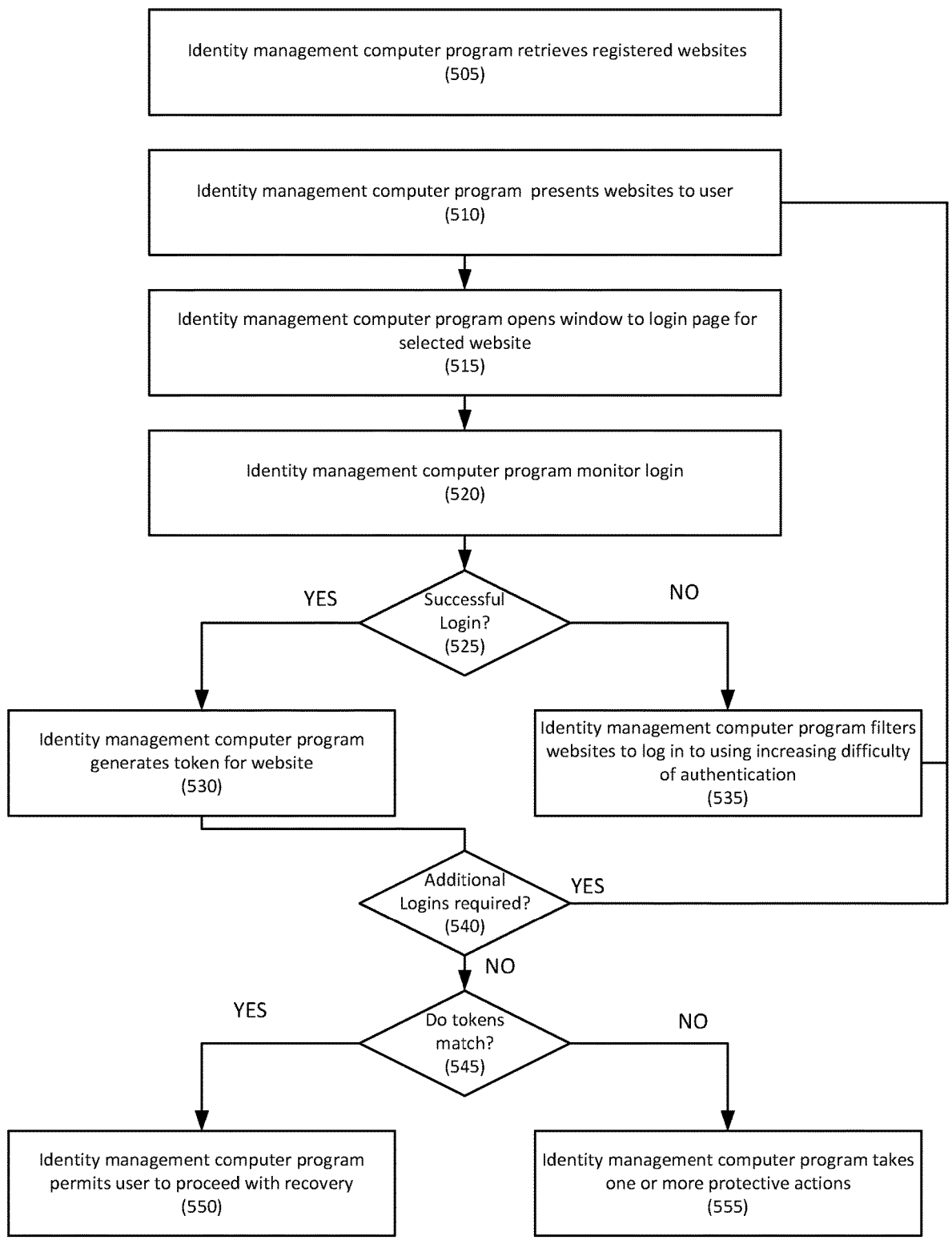
FIG. 5 depicts method for authentication according to one embodiment.

In one embodiment, in addition to logging in, the user may be required to log into the same website(s) that the user logged in to during registration. Referring to FIG. 5, a method for authentication is disclosed according to an embodiment.

In step 505, the identity management computer program may retrieve and identification of the website(s) that the user successfully logged in to during registration, and in step 510, may present the websites to the user and request that the user log in to some or all of the websites.

In step 515, the user may select a website, and the identity management computer program may open a window with a login page to the selected website.

In step 520, the identity management computer program may monitor whether the user successfully logged into the website. If, in step 525, the user was successful, in step 530, the identity management computer program may create a token for the successful login. If they user was unsuccessful, in step 535, the identity management computer program may apply increasing difficulty of authentication logic to require the user to log into a more secure website.

In step 540, if additional logins are required, the process may return to step 510. If additional logins are not required, in step 545, the identity management computer program may compare the token(s) in step 530 to the stored tokens. In one embodiment, this may involve retrieving the token(s) from decentralized storage.

If there is a match, in step 550, the user may proceed with recovery. If not, in step 555, protective actions, such as locking the user's account, sending a notification, etc. may be taken as is necessary and/or desired.

Referring again to FIG. 4, in step 410, the user may request identity data from identity management computer program.

In step 415, the identity management computer program may retrieve the mapping of identity data portions and nodes used to store the identity data portions during registration.

In step 420, the identity management computer program may retrieve the identity data portions from the plurality of nodes, and in step 425, the identity management computer program may reconstruct the identity data from identity data portions using the mapping. For example, the identity management computer program retrieves "Tom" from Node 1, "Jones" from Node 2, and first 4 digits of the user's bank account from Node 3. This will be collated.

In step 430, the identity management computer program may return the reconstructed identity data to the user computer program. In one embodiment, the identity data may then be stored in the user's wallet, the user's electronic device, etc.

Following recovery, in embodiments, additional action(s) may be taken. In one embodiment, the user's identity may be frozen. For example, if the user's mobile phone is lost, the user may log in from a web application or browser and freeze the user's identity for security purposes.

In one embodiment, the user's other registered devices may be sent an alert, a confirmation, etc. that the user's identity information is being or was recovered.

In one embodiment, identity information associated with the lost device, or that are no longer valid, may be revoked and/or invalidated.

In one embodiment, attempts to recover the user's identity information (successful and/or unsuccessful) may be recorded to the network in a similar manner as identity information may be stored. In another embodiment, attempts may be written to a different store as is necessary and/or desired.

Although multiple embodiments have been described, it should be recognized that these embodiments are not exclusive to each other, and that features from one embodiment may be used with others.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above.

Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for decentralized storage of identity data, comprising:
    generating, by an identity management computer program executed by a computer processor, an identity recovery token for a user;
    receiving, by the identity management computer program, an identity data field comprising identity data for the user from a user electronic device;
    parsing, by the identity management computer program, the identity data into a plurality of portions, wherein each portion alone does not comprise data that identifies the user;
    mapping, by the identity management computer program, each portion to one of a plurality of decentralized storage nodes; and
    storing, by the identity management computer program, the plurality of portions to the plurality of decentralized storage nodes with the identity recovery token based on the mapping.

2. The method of claim 1, wherein the identity data comprises a plurality of identity data fields, and the identity management computer program parses each identity data field into portions.

3. The method of claim 2, wherein one of the decentralized storage nodes comprises portions from two of the plurality of identity data fields.

4. The method of claim 1, wherein the identity data comprises personally identifiable information.

5. The method of claim 1, wherein the identity data comprises data associated with the user.

6. The method of claim 1, wherein the identity data is parsed so that all portions are needed to reconstruct the identity data.

7. The method of claim 1, wherein the identity management computer program selects the decentralized storage nodes randomly.

8. A method for identity data recovery from decentralized identity data storage, comprising:
    receiving, by an identity management computer program executed by a computer processor, a request to retrieve an identity data field comprising identity data for a user from decentralized storage, wherein the identity data is stored as a plurality of portions in a plurality of decentralized storage nodes with an identity recovery token for the user, wherein each portion alone does not comprise data that identifies the user;
    retrieving, by the identity management computer program, a mapping of the plurality of portions of identity data to the plurality of decentralized storage nodes;
    retrieving, by the identity management computer program, the plurality of portions of identity data and the identity recovery token from the plurality of decentralized storage nodes;
    reconstructing, by the identity management computer program, the plurality of portions of identity data using the mapping; and
    providing, by the identity management computer program, the reconstructed identity data to an electronic device for the user.

9. The method of claim 8, wherein the identity data comprises a plurality of identity data fields, and each portion is parsed from one of the identity data fields.

10. The method of claim 8, wherein the identity data comprises personally identifiable information.

11. The method of claim 8, wherein the identity data comprises data associated with the user.

12. The method of claim 8, wherein the identity data is parsed so that all portions are needed to reconstruct the identity data.

13. The method of claim 8, wherein the electronic device for the user is configured to save the reconstructed identity data.

14. A system, comprising:
    an electronic device comprising:
        a memory comprising an identity management computer program; and
        a computer processor; and
    decentralized storage comprising a plurality of decentralized storage nodes;

wherein the identity management computer program is configured to:
  generate an identity recovery token for a user;
  receive identity data for the user from a user electronic device;
  parse the identity data into a plurality of portions;
  map each portion to one of the plurality of decentralized storage nodes; and
  store the plurality of portions to the plurality of decentralized storage nodes with the identity recovery token based on the mapping.

15. The system of claim 14, wherein the identity data comprises a plurality of identity data fields, and the identity management computer program parses each identity data field into portions.

16. The system of claim 14, wherein the identity data comprises personally identifiable information.

17. The system of claim 14, wherein the identity data is parsed so that all portions are needed to reconstruct the identity data.

18. The system of claim 14, wherein the identity management computer program selects the decentralized storage nodes randomly.

19. The system of claim 14, wherein the identity management computer program is further configured to:
  receive a request to retrieve identity data for the user from the plurality of decentralized storage nodes with the identity recovery token;
  retrieve the mapping of the plurality of portions of identity data to the plurality of decentralized storage nodes;
  retrieve the plurality of portions of identity data and the identity recovery token based on the mapping from the plurality of decentralized storage nodes;
  reconstruct the plurality of portions of identity data using the mapping; and
  provide the reconstructed identity data to an electronic device for the user.

20. The system of claim 19, wherein the electronic device is configured to store the reconstructed identity data in an electronic wallet.

* * * * *